Aug. 22, 1961

J. A. HUGGINS ET AL 2,997,336

SIDE LOADING SUBURBAN VEHICLE

Filed March 13, 1959

INVENTORS.
JAMES A. HUGGINS
CLIFFORD C. VOSS
AND FRED W. GRANT.

By Harness and Harris
ATTORNEYS.

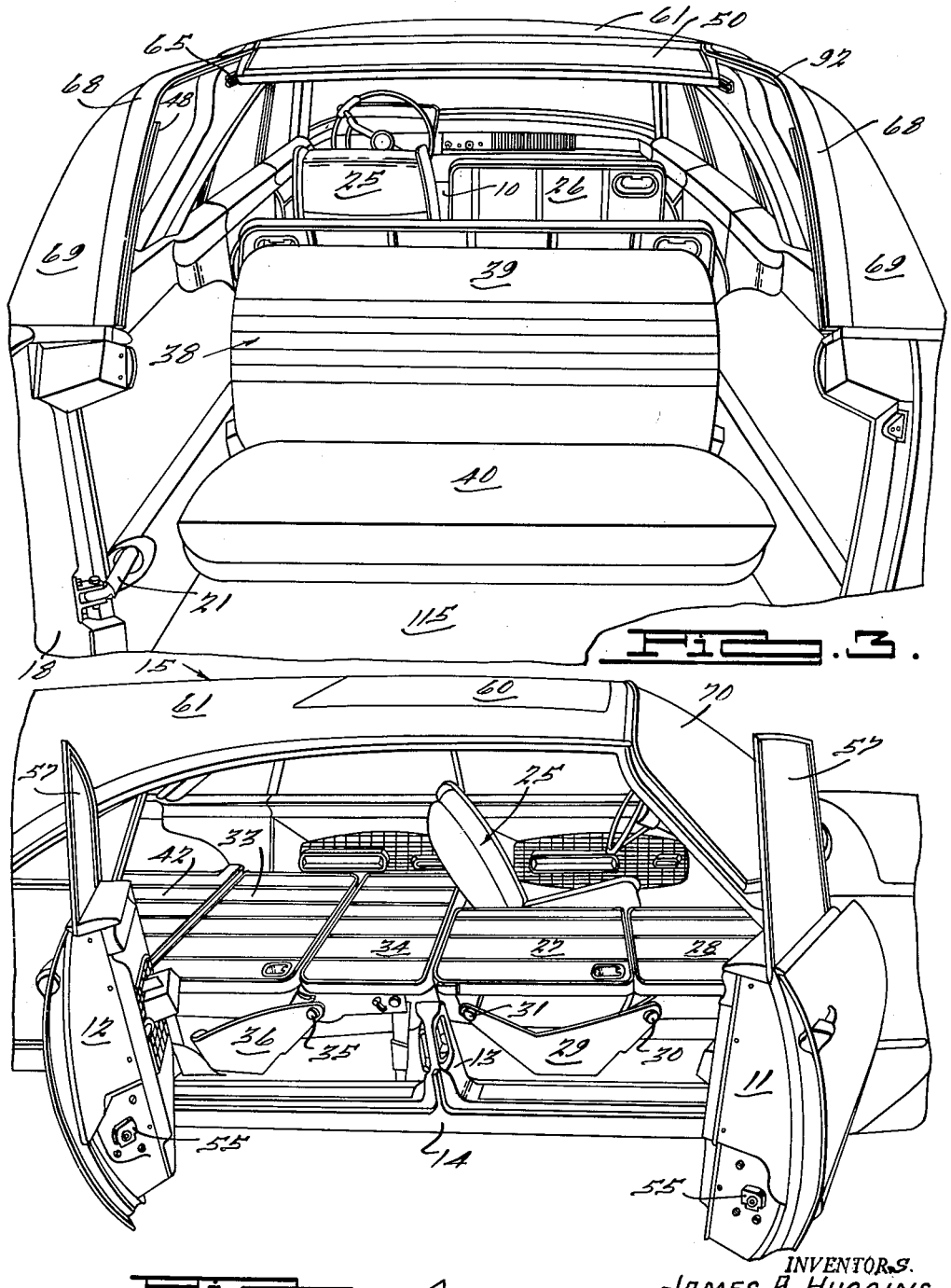

Aug. 22, 1961 J. A. HUGGINS ET AL 2,997,336
SIDE LOADING SUBURBAN VEHICLE
Filed March 13, 1959 8 Sheets-Sheet 3

INVENTORS.
JAMES A. HUGGINS
CLIFFORD C. VOSS
AND FRED W. GRANT
By Harness and Harris
ATTORNEYS.

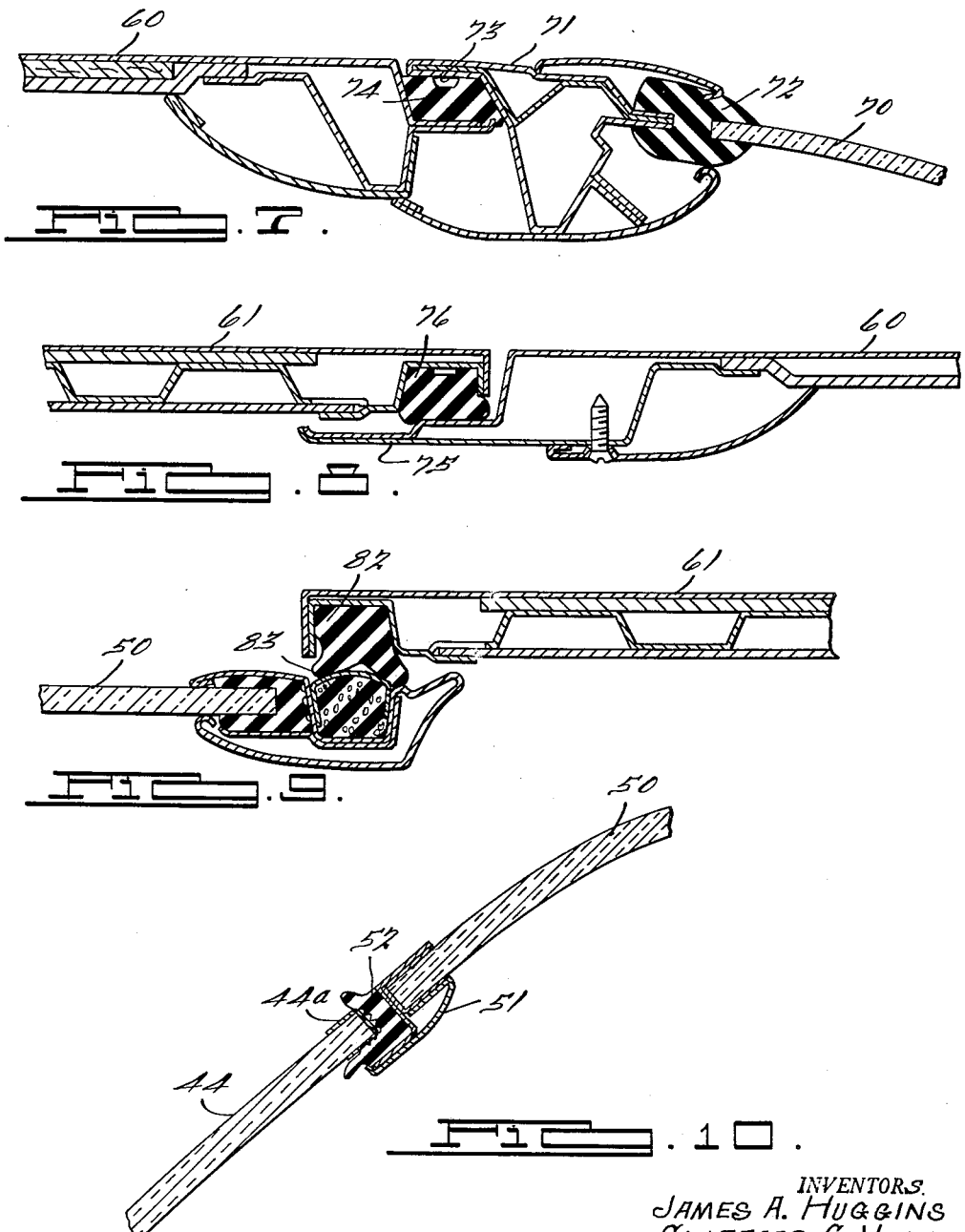

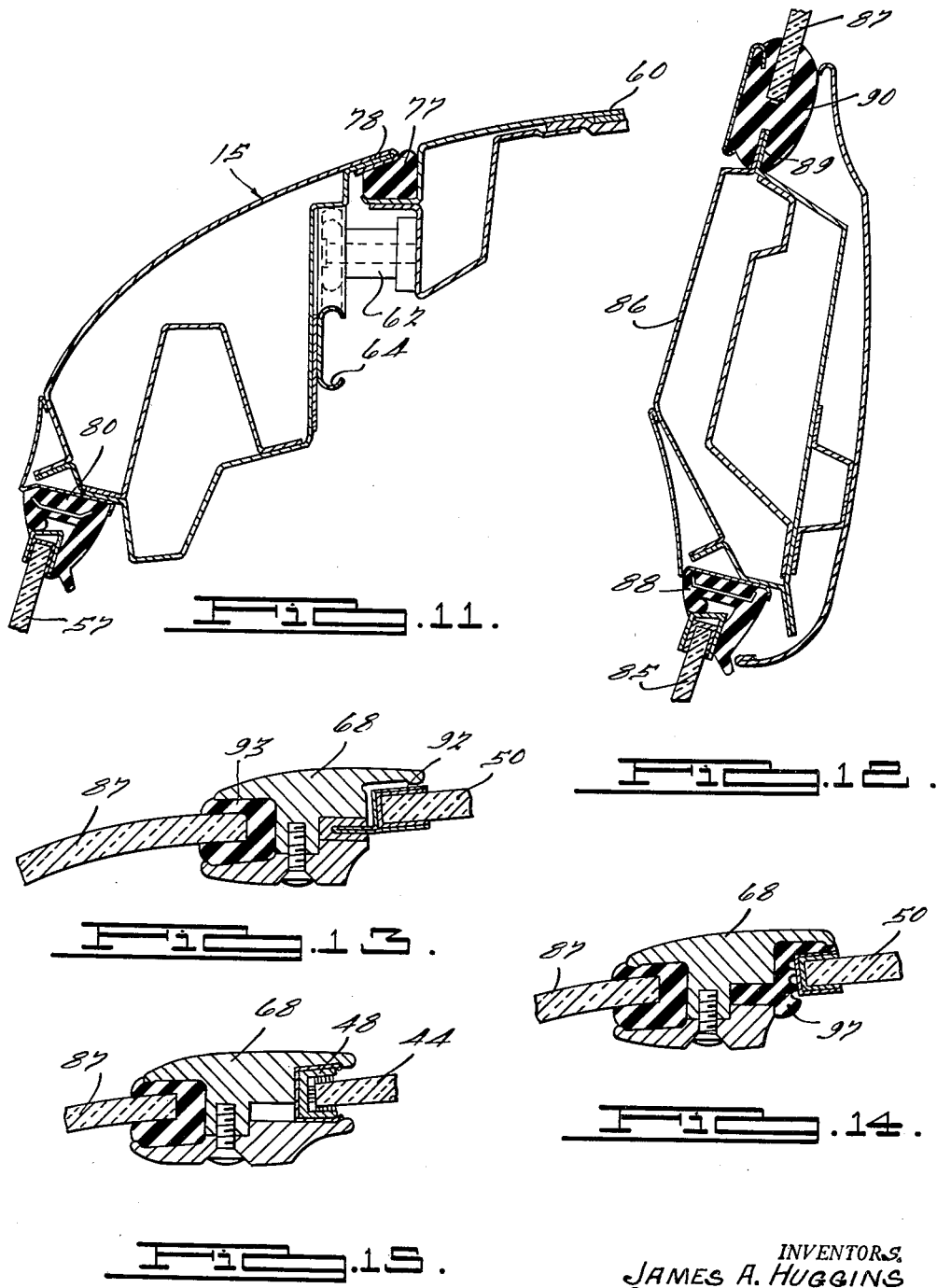

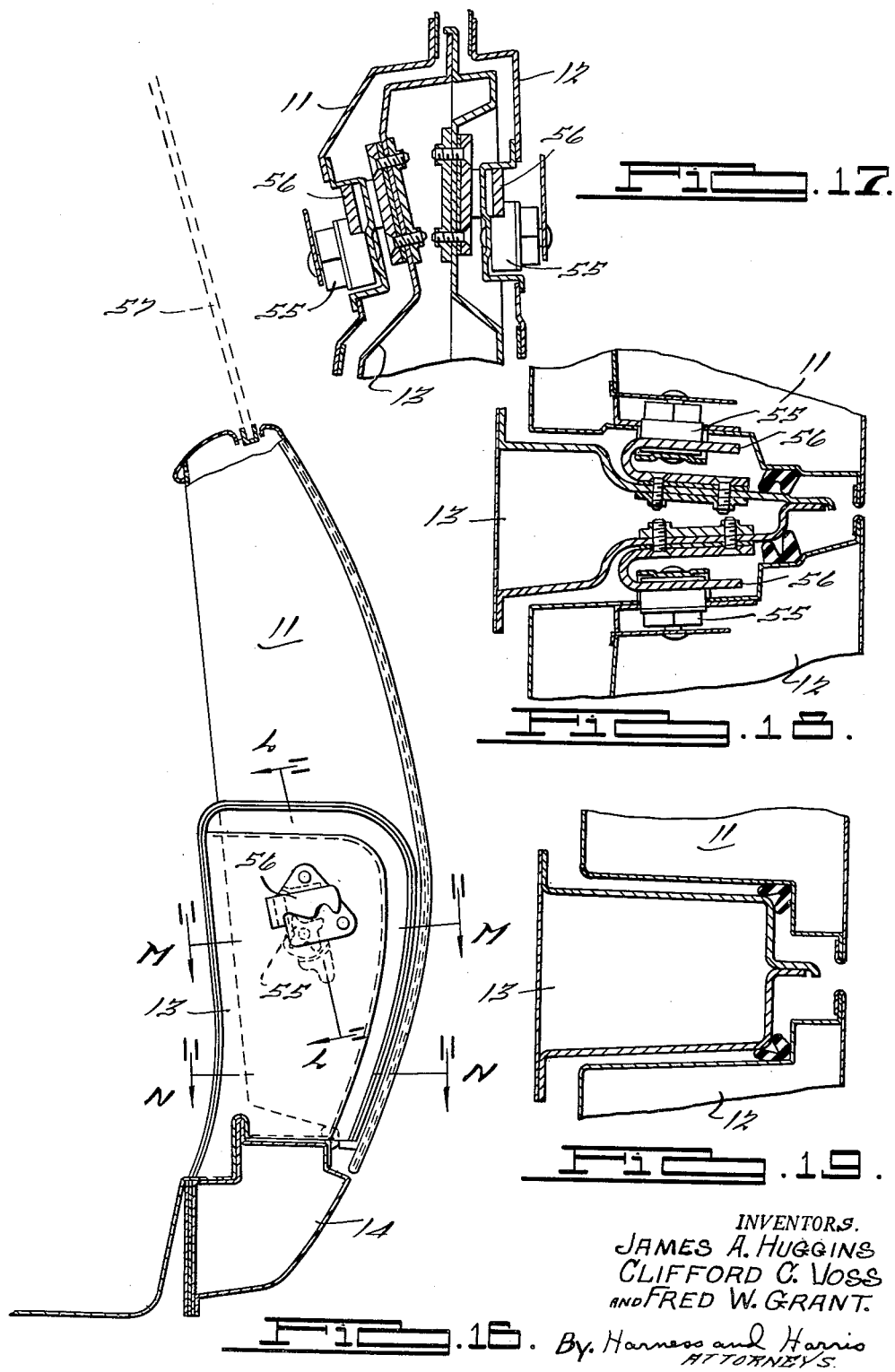

Aug. 22, 1961  J. A. HUGGINS ET AL  2,997,336
SIDE LOADING SUBURBAN VEHICLE
Filed March 13, 1959  8 Sheets-Sheet 7
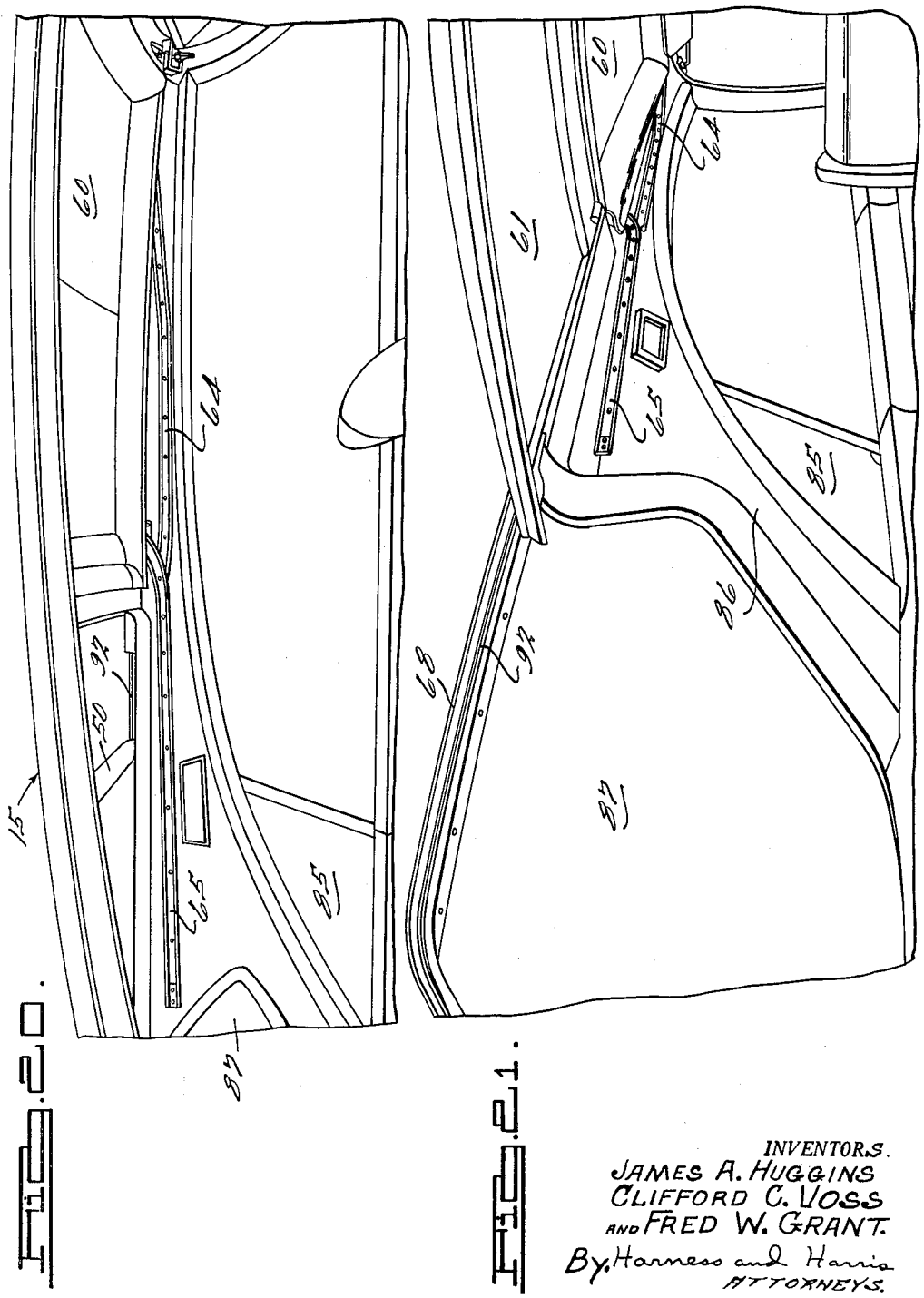
INVENTORS.
JAMES A. HUGGINS
CLIFFORD C. VOSS
AND FRED W. GRANT.
By Harness and Harris
ATTORNEYS.

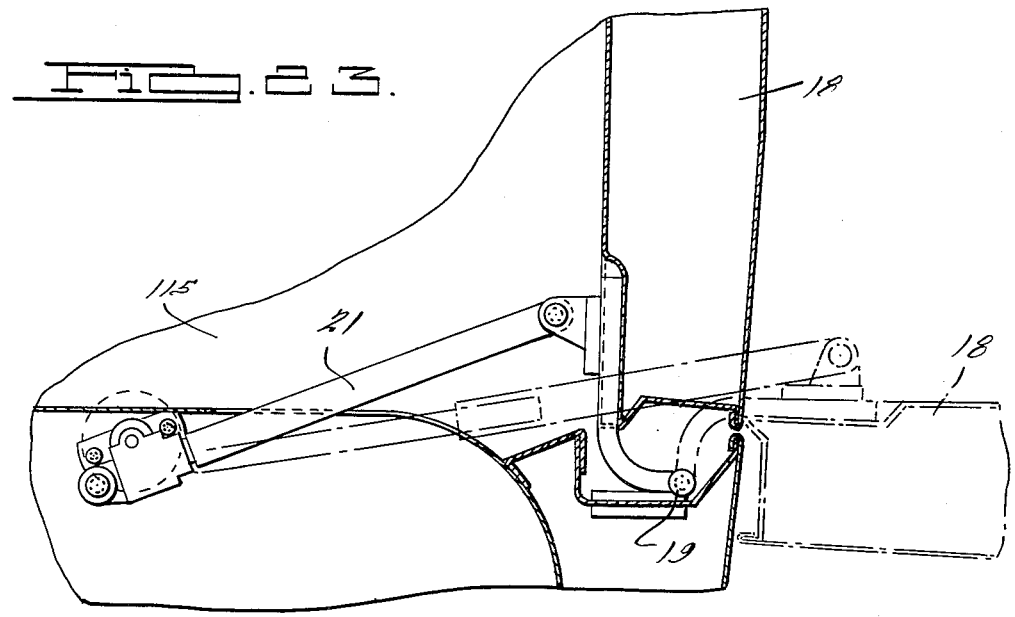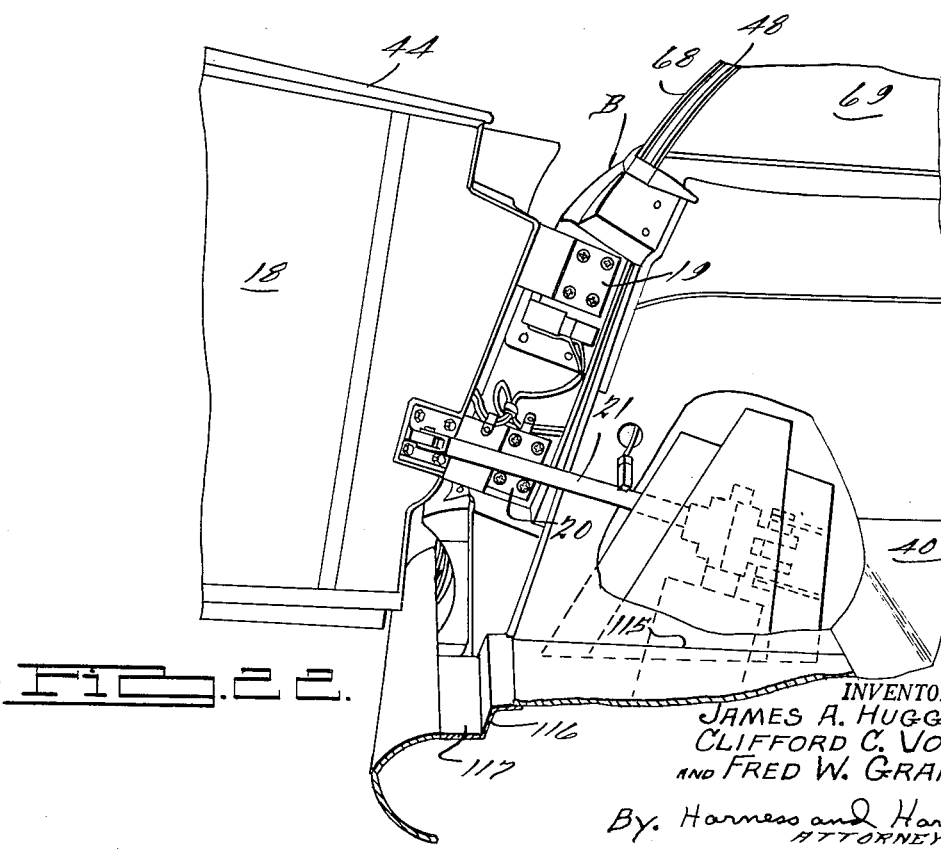

2,997,336
Patented Aug. 22, 1961

2,997,336
SIDE LOADING SUBURBAN VEHICLE
James A. Huggins, Birmingham, Clifford C. Voss, Clawson, and Fred W. Grant, Huntington Woods, Mich., assignors to Chrysler Corporation, Highland Park, Mich., a corporation of Delaware
Filed Mar. 13, 1959, Ser. No. 799,303
8 Claims. (Cl. 296—106)

This invention relates to a convertible suburban vehicle. Specifically this invention is concerned with a 4-door, three seat, suburban vehicle that is ideally adapted to be used for load carrying purposes as well as a passenger vehicle of the convertible or "sunshine roof" type. Certain aspects of the invention disclosed in this application relate to the manner of arranging the seats within the vehicle so as to provide maximum seating as well as maximum load carrying capacity. Also, certain other aspects of the invention relate to the manner of forming the top and the various movable sections thereof as well as their mounting means with respect to the vehicle body. Other features of this invention relate to the manner of hinging the doors, the manner of locking the doors to the associated body elements, and the manner of hinging the seat backs and load supporting portions. Still another feature of this invention relates to the manner in which the rear end of the vehicle is formed with a side hinged door as well as an unobstructed step formation to assist passengers entering and leaving the vehicle from the rear end.

It is a particular feature of this invention to provide a suburban vehicle wherein various features that are normally provided in hard top vehicles or convertibles are incorporated in a combination suburban-type vehicle and load carrying vehicle.

Other advantages of this invention will become readily apparent from a consideration of the following description and the related drawings wherein:

FIG. 3 is a rear end elevational view showing the rear door in open position and the rear roof panel moved to a forwardly concealed position;

FIG. 4 is a fragmentary side elevational view of the vehicle body showing the seats in folded down position and the doors along one side of the vehicle in open position;

FIG. 7 is an enlarged, fragmentary, sectional elevational view taken along the line A—A of FIG. 1;

FIG. 8 is another enlarged, fragmentary, sectional elevational view taken along the line B—B of FIG. 1;

FIG. 9 is still another enlarged, fragmentary, sectional elevational view taken along the line C—C of FIG. 1;

FIG. 10 is another enlarged, fragmentary, sectional elevational view taken along the line D—D of FIG. 6;

FIG. 11 is an enlarged, fragmentary, sectional elevational view taken along the line E—E of FIG. 1;

FIG. 12 is an enlarged, fragmentary, sectional elevational view taken along the line F—F of FIG. 1;

FIG. 13 is an enlarged, fragmentary, sectional elevational view taken along the line G—G of FIG. 1;

FIG. 14 is an enlarged, fragmentary, sectional elevational view taken along the line H—H of FIG. 1;

FIG. 15 is an enlarged, fragmentary, sectional elevational view taken along the line J—J of FIG. 1;

FIG. 16 is an enlarged, fragmentary, elevational view taken along the line K—K of FIG. 1;

FIG. 17 is an enlarged, fragmentary, sectional elevational view taken along the line L—L of FIG. 16;

FIG. 18 is an enlarged, sectional elevational view taken along the line M—M of FIG. 16;

FIG. 19 is an enlarged, sectional elevational view taken along the line N—N of FIG. 16;

FIG. 20 is an enlarged, fragmentary, interior elevational view of the roof portion of the vehicle along one side thereof;

FIG. 21 is another enlarged interior elevational view looking from the rear end of the vehicle toward the front end at one side thereof;

FIG. 22 is an enlarged elevational view of a portion of the rear end of the vehicle showing the rear door or tail gate in open position; and FIG. 23 is a top elevational view of the structure shown in FIG. 22.

Figure 1:
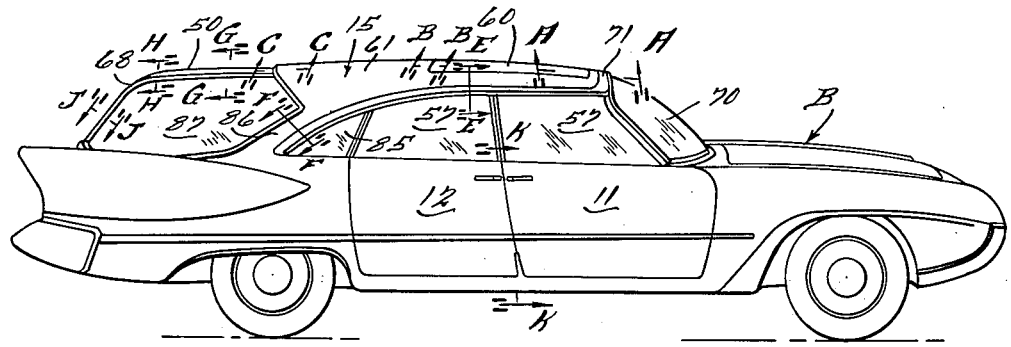
FIG. 1 is a side elevational view of a suburban vehicle embodying this invention.

The vehicle body shown specifically in FIGS. 1 through 6, is designed such that it may be loaded with passengers from either side and/or from the rear end thereof. Likewise, mounting means are provided with respect to the various seat units such that substantially the entire interior of the vehicle may be converted for load carrying purposes. It will be noted from FIG. 1 that the side doors are arranged such that the front door on each side is hinged adjacent its front end, and the rear door on each side is hinged adjacent its rear end. With this specific arrangement for hinging of the side doors, it is possible to open up the entire side of the vehicle so that particularly large objects may be loaded from either side of the vehicle. FIG. 4, in particular, shows the arrangement of the seats such that a large sized load article might be loaded into the vehicle from either side of the vehicle. It will also be noted from FIGS. 4 and 5 that each of the seats except the driver's seat 25 can be turned down to provide a load carrying platform. The load carrying platform provided in this vehicle can be arranged to extend from the rear end thereof forwardly to the fire wall at the front end of the driver's compartment. As can be clearly seen from FIG. 3 this suburban vehicle is a three seat vehicle wherein the front seat units 25, 26 and the middle seat unit 32 face forwardly whereas the rear seat unit 38 faces rearwardly. This particular arrangement of seats in a suburban vehicle has been disclosed in a copending application of James A. Huggins, Serial No. 538,150, filed October 3, 1955, now U.S. Patent 2,888,296. The particular invention herein disclosed is an improvement over certain of the inventions shown in the noted Huggins application.

In the drawings reference numeral B represents generally the body of the suburban vehicle. This vehicle is a so-called 4-door vehicle wherein two doors 11, 12 respectively are hinged at each side of the vehicle. The front door 11 on each side of the vehicle is hinged at its front edge whereas the rear door 12 on each side of the vehicle is hinged adjacent its rear edge. From FIGS. 2 and 4, it will be noted that the so-called "middle post" 13 is a relatively short member that extends upwardly only to about the height of the top of the seat unit cushions. It is thought to be obvious from a consideration of FIG. 4, that the reason for making the "middle" posts 13 relatively short is to permit the loading of the vehicle interior from the sides without any interference from the "middle" post. In conventional four door vehicle bodies the "middle" post extends from the sill 14 to the top 15 of the vehicle. It will be noted from FIGS. 2 and 4, as well as FIGS. 16 through 19, that the lock mechanisms for the doors 11, 12 are mounted at the lower portions of the door side edges such that they may engage with mating lock portions on the front and rear sides respectively of the shortened "middle" post element 13.

Figure 5:
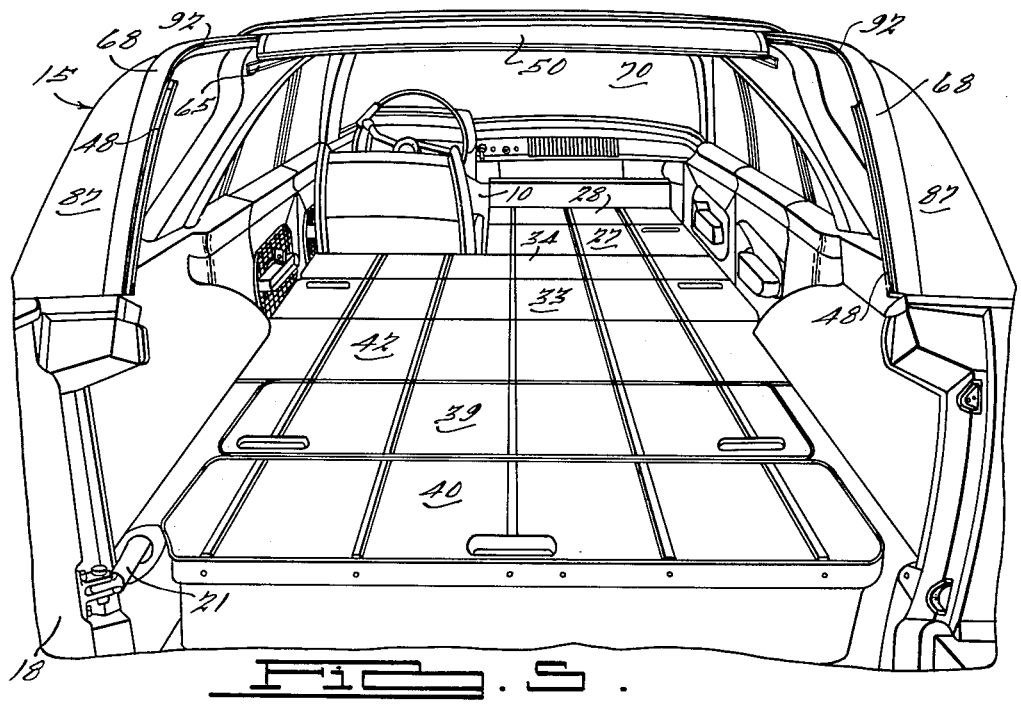
FIG. 5 is a rear end elevational view of the suburban vehicle with all of the seats except the driver's seat turned down to give the maximum load carrying capacity.

In addition to loading the interior of the vehicle body B from either side, it is also possible to load the vehicle interior from the rear end due to an exceptionally large rear door or tailgate 18. FIGS. 3 and 5, as well as FIGS. 22 and 23, are thought to clearly show the manner of hinging the rear door or tailgate 18 along the left side of the rear end of the vehicle body B. From FIG. 22 particularly it will be noted that tailgate 18 is supported by a pair of upper and lower hinges 19, 20, respectively. Furthermore, the tailgate 18 is intended to be actuated by means of an electrically operated screw jack mechanism 21. It is foreseeable that tailgate 18 can also be manually operated rather than by the electrically operated mechanism 21. However, because of the use of electrically operated mechanism 21, it is possible for the driver of the vehicle to remain in his seat 25 and to open and close the tailgate 18 to permit access to and exit from the rear of the vehicle.

Figure 2:
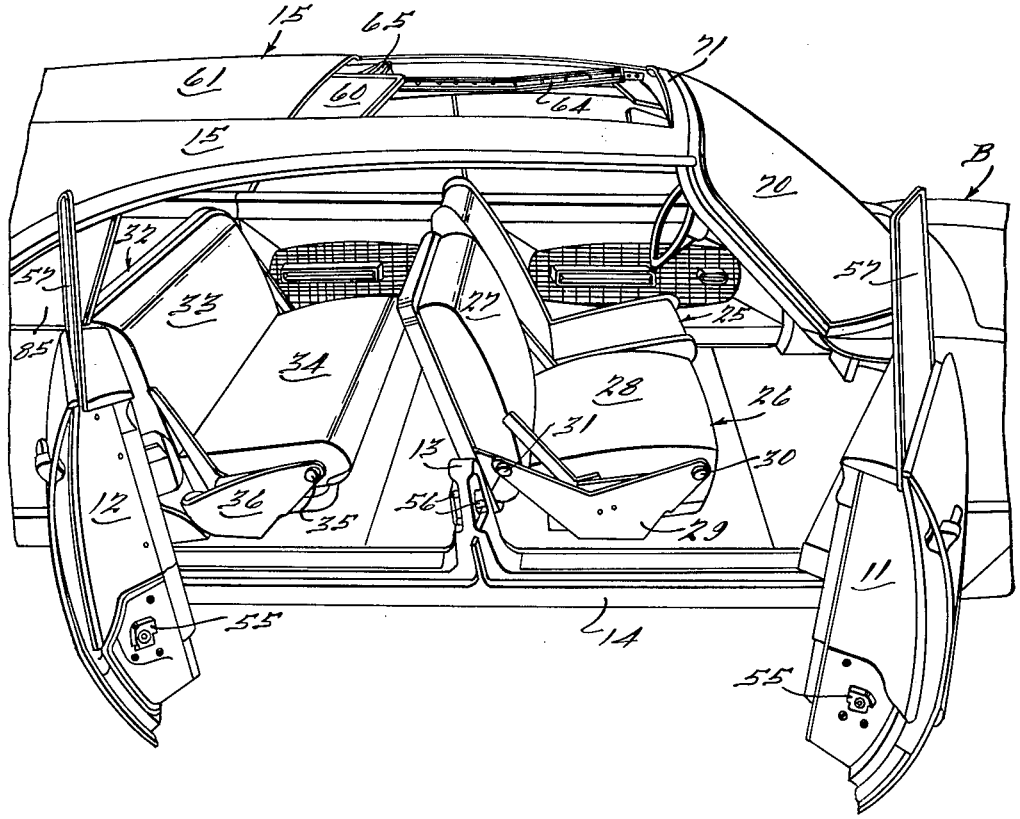
FIG. 2 is a fragmentary side elevational view of the vehicle shown in FIG. 1 with the vehicle doors along one side being shown in their open position.

Now considering the seating of the vehicle, it will be noted from FIG. 2 in particular that the front and middle seat units 25, 26 and 32 respectively face forwardly whereas the rear seat unit 38 faces rearwardly. The front seat is composed of two separate seat units 25 and 26 respectively. The seat unit 25 is the driver's seat and it can be either a rigid element or one in which the back is foldable with respect to the seat portion. Seat unit 26 is composed of a back section 27 and a seat section 28 wherein each of the sections are pivotally mounted for folding and unfolding. FIGS. 2 and 4 show that the seat section 28 of the passenger seat unit 26 is pivotally mounted to the frame base 29 at 30 such that the seat section 28 may be inverted to extend forwardly to approximately the fire wall 10 between the passenger compartment and the engine compartment (not shown). Likewise, these figures show that the back section 27 of the front passenger seat unit 26 is pivotally mounted at 31 on the base frame 29 such that it may be turned down in the manner shown in FIG. 4 wherein the back portion thereof is coplanar with the underside of the inverted seat section 28. Seat unit 25 that provides the driver's seat can be identical to the seat unit 26 so that seat 25 may be unfolded to permit loading of the vehicle through the doors 11, 12 on the driver's side of the vehicle.

The middle seat unit 32 is composed on a back section 33 and a seat section 34. The seat section 34 is hingedly mounted at 35 on the base frame 36 such that it may be inverted forwardly in the same manner as the front seat section 28. The back section 33 of the middle seat 32 is hingedly mounted by means not shown (but similar to the means shown in J. A. Huggins application Serial No. 538,150, now U.S. Patent 2,888,296) which also permit it to be pivoted forwardly so that the back portion thereof may be arranged in coplanar relationship with the underside of the inverted seat section 34. This arrangement is thought to be clearly shown in FIG. 4 and FIG. 5.

The rear seat unit 38 is composed of the back section 39 and the seat section 40. The seat section 40 is hingedly mounted adjacent its forward ends (means not shown, but similar to those in J. A. Huggins Serial No. 538,150, now U.S. Patent 2,888,296) such that the seat section 40 may be inverted so as to cover the rear end portion of the vehicle floor as clearly shown in FIG. 5. The back section 39 is hingedly mounted (means not shown, but similar to those in J. A. Huggins application Serial No. 538,150, now U.S. Patent 2,888,296) adjacent its lower edge such that it may be turned rearwardly and downwardly so as to be aligned with the seat section 40 and provide a coplanar floor with the other inverted seat units as clearly shown in FIG. 5.

Between the rearwardly facing third seat unit 38 and the forwardly facing middle seat unit 32 is a fixed floor section 42. This floor section is substantially at the heighth of the chassis frame kickup which is not shown in this figure. It is the heighth of the fixed floor section 42 that determines the plane in which the several hingedly mounted seat sections are aligned to provide the coplanar floor surface for load supporting purposes.

The hinging of the middle seat unit 32 and the rearwardly mounted seat unit 38 is quite similar to the arrangement that is shown and claimed in the aforementioned J. A. Huggins patent application Serial No. 538,-150 filed October 3, 1955, now U.S. Patent 2,888,296. No claim is made in this application for this specific hinged mounting of the middle seat 32 and the rear seat 38. However, to the arrangement shown in the aforementioned J. A. Huggins application, there has been added the hingedly mounted sectionalized front seat unit 26 wherein the passenger seat unit 26 can be unfolded to provide an extension of the load supporting surface that will extend to the front end of the passenger compartment of the vehicle adjacent the fire wall 10. This is a very important feature as it permits carrying of articles of approximately ten (10) feet in length within the vehicle body.

Figure 6:
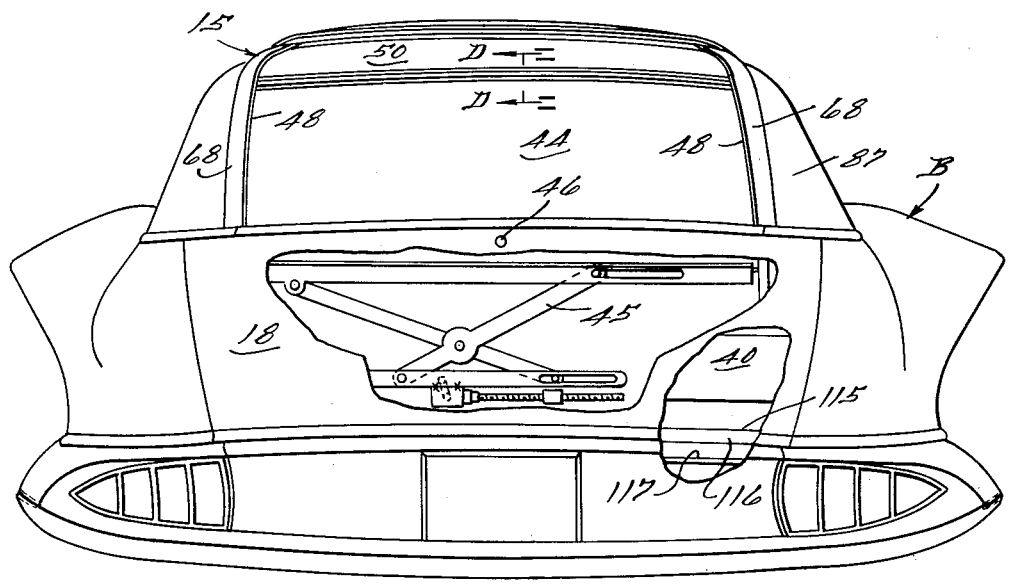
FIG. 6 is a rear end elevational view of the vehicle with the door in closed position, certain of the door structure being broken away for the sake of clarity.

Looking at FIG. 6 in particular, it will be noted that the tailgate or rear door 18 at the rear end of the vehicle includes an electrically operated window 44. The mechanism for operating the window 44 is identified by the reference numeral 45. While the specific mechanism 45 can be used to elevate the window 44, still, it is thought to be obvious that any conventional type of window elevating mechanism that lends itself to electrical operation may be used in place of the specific mechanism shown at 45. As will be explained hereafter, the window 44 carried by the rear door 18 is adapted to be operated by the vehicle operator from a push button control located in the driver's compartment of the vehicle. Furthermore, there is also electrically operated means provided for key operation of the rear door 18 such that when the door operating means is actuated by rotation of the key in the tailgate or rear door lock 46 that first the window mechanism 44 will be lowered into the tailgate 18 after which the door 18 will be moved to an open position by the screw jack mechanism 21. When the control means for the door 18 is actuated to close the door the jack mechanism 21 will first move the door 18 into closed position in which position a switch will be automatically actuated that will thereafter elevate the window mechanism 44 to its raised position as shown in FIG. 6. Separate control means is also provided to raise and lower the window 44 of the rear door 18 that is disassociated from the door opening mechanism 21.

As can be seen from FIGS. 6 and 22, the rear portion of the vehicle body top 15 has stringers 68 with trackways 48 on their inner sides that receive and guide the side edges of the rear door window 44 so that it will be guided upwardly as it is elevated out of the door section 18. In raised position the rear door window 44 contacts and joins with the rear edge of the slidable roof panel section 50. The connection 51 between the rear roof slidable panel 50 and the upper edge of the rear door window 44, when window 44 is in raised position, is clearly shown in FIG. 10 which is an enlarged view of this connection.

From FIG. 10 it will be noted that the rear slidable roof panel 50 carries a sealing channel 51 that has a sealing strip of resilient material 52 adapted to engage and seal against the upper edge 44a of the tailgate window 44 when the window 44 is in raised position. This connection also insures a leakproof, long lasting seal.

FIGS. 16 through 18 show the specific means for latching the front and rear doors 11, 12 at each side of the vehicle body B to the shortened or stub "middle" post 13. It will be noted that the lower portion of the side edge of each of the doors 11, 12 mounts a rotatable latch bolt mechanism 55. The opposite sides of the stub post 13 each carry a U-shaped keeper element 56 adapted to engage the rotary bolt mechanism 55 of the doors 11, 12 so as to provide safety latches for retaining the doors 11, 12 in latched position. As can be seen from FIG. 16, each of the doors 11, 12 include a vertically movable window 57 that may be raised from or lowered into the hinged door unit 11 or 12. The mechanism for elevating and retracting the window elements 57 is of conventional form and is not shown not thought to need description at this time.

The vehicle body top 15 has a pair of spaced, longitudinally extending stringers 68 (see FIGS. 1, 5 and 13) extending from the rear portion thereof. Stringers 68 serve as rear window supports and also as trackways for the movable rear roof panel 50 and the rear door window 44. It is thought to be clear that the rear movable roof panel 50 can be retracted forwardly because of its slidable mounting in the trackways 92.

Part of the invention disclosed in the vehicle body B relates to the various slidable panels utilized in the top 15. Top 15 includes the forward slidable panel 60 that can be moved rearwardly and downwardly so that it is stowed in retracted position beneath the permanent top section 61 of the vehicle top 15. At the same time that the forward movable section 60 is stowed beneath the permanent section 61 of the top, it is also possible to move the rear movable top section 50 forwardly. FIGS. 3 and 4 of the drawings show the rear movable top section 50, which is of glass or some transparent material, moved forwardly beneath the fixed top section 61 of the vehicle top. FIG. 6 of the drawings shows the movable rear top section 50 when it has been extended to cover the rear seat portion of the vehicle body and engage the raised rear door window section 44 so as to completely enclose the rear portion of the vehicle body. When the rear movable top section 50 is moved forwardly to uncover the rear seat unit 38, the top section 50 is stowed immediately below the fixed top section 61. In the event that the forward movable top section 60 is retracted rearwardly at the same time that the rear movable top section 50 is moved forwardly, it will be found that the forward top section 60 is depressed beneath the rear roof section 50, due to the angled trackways 64, 65 (see FIGS. 20 and 21), so that the forward top section 60 can nest below the fixed top section 61 and the rear movable top section 50. From FIGS. 20 and 21 it is thought to be clear that the front end of the forward top section 60 is connected through rollers 62 to the forward tracks 64 whereas the rear end of the movable forward top section 60 is connected by rollers (not shown) to the trackways 65. By means of the sloping guideways 64, 65 provided for the forward movable top section 60, no interferences occur in the event it should be desired to retract both the rear movable top section 50 and the forward movable top section 60 beneath fixed section 61 at the same time. While in the drawings the forward movable top section 60 is shown as being made of an opaque material, such as metal or the like, to complement the fixed top section 60, still, it is possible that this forward movable top section 60 could be made of a transparent material so as to provide a so-called "sunshine roof." It will be noted that the rear movable top section 50 is formed of a transparent material such as glass, lucite, or the like.

The top 15 of the vehicle body B may be considered to comprise a windshield 70 that has its upper portion connected to a frame member 71 through a resilient sealing strip 72. (See FIG. 7.) Frame member 71 has a channel 73 along its rear edge that is adapted to receive the forward edge of the movable roof panel section 60. It will be noted that the forward edge of the movable roof section 60 carries a resilient sealing strip 74 that is adapted to seat in and seal against the channel 73 in the rear edge of the windshield frame member 71.

Looking at FIG. 8, it will be noted that the rear edge of the forward movable roof section 60 carries a protruding lip portion 75 that is adapted to engage the sealing strip 76 in the under side of the forward edge of the fixed centrally located roof section 61. With the arrangement disclosed in FIGS. 7 and 8, it is thought to be obvious that a weatherproof seal is obtained between the section 60 and the surrounding roof structure 15 when panel 60 is in extended or closed position. Furthermore, the sloping trackways 63, 64 produce minimum wear on the panel seals and require minimum effort on the part of the operator. When the movable forward roof sections 60 is in its extended or closed position then both the forward and rear edges of panel 60 sealingly engage resilient sealing strips 74, 76 which provide a weatherproof, waterproof seal along the forward and rear edges of the movable section 60.

Looking at FIG. 11, it will be noted that forward movable roof section 60 carries roller elements 62 along its side edges that are adapted to engage in the trackways 64, 65. FIG. 11 shows the roller element 62 that is mounted in the forward track 64. The roller element 62 is carried by the forward end of the roof section 60. It is thought to be obvious from the shape of the trackways 64 that as the roof section 60 is moved rearwardly it will also be guided downwardly so that the sealing element 77 carried by the roof section 60 will be disengaged from the overlying flange 78 that is a part of the roof main structure 15. There is another roller (not shown) similar to the roller element 62 carried by the rearward portion of the movable roof section 60 and this other roller element engages in and moves along the sloped trackways 65. FIG. 11 also shows that the fixed roof section 61 carries along its outer side edges downwardly facing sealing elements 80 that are adapted to engage the upper edges of the door windows 57 when the windows 57 are in raised position.

From FIG. 9 it will be noted that the rear edge of the fixed roof section 61 carries along its undersides a recessed sealing element 82. The sealing element 82 is adapted to engage the forward edge of the movable rear roof section 50 when the roof section 50 is in its extended or closed position. The sealing element 82 on fixed roof section 61 is arranged to sealingly engage an edge sealing element 83 on the forward edge of the roof section 50, as clearly shown in FIG. 9, when the rear movable roof section 50 is in extended or closed position.

FIG. 12 shows a section across the rear portion of the rear window 85 and across the rear quarter roof side panel 86. The rear quarter roof side panel 86 has a sealing strip section 88 that is adapted to sealingly receive the edge of the window panel 85. Also, a flange portion 89 on the rear quarter roof side panel 86 seats a resilient sealing element 90 that receives an edge portion of the transparent panel section 87 that forms a side wall of the rear portion of the top 15.

From a consideration of FIGS. 1 and 5 particularly, it will be noted that the permanent portion 61 of the vehicle body roof 15 has a pair of stringer elements 68 extending rearwardly therefrom that are bowed downwardly so that their rear ends seat upon the rear end of the body B at the belt line. These stringer sections 68 provide the support for the trackways 48 that receive the rear window 44 of the tailgate 18. The stringer sections 68 also include trackways 92 to support the rear movable roof section 50. The stringer elements 68 that project rearwardly from the fixed section 61 of the roof top 15 add rigidity to the rear end of the roof portion 15 that is essentially of glass or some similar transparent material and serve as roll over bars to support the rear end of the vehicle in the event the vehicle should be turned upside down during an accident. In addition to supplying rigidifying structure for the rear end of the vehicle body, the stringers 68 also provide a portion of the frames for the window panel sections 87 along the side walls of the rear portion of the vehicle body. As previously mentioned the stringers 68 also serve as trackways for both the rear door window 44 and the rear movable roof section 50.

FIG. 13 shows a section across one of the stringer elements 68 where the inner side of the stringer 68 includes the concealed trackway 92 that receives the side edge of the removable rear roof panel 50. Likewise, the outer side edge of the stringer element 68 has a channel in which is mounted a resilient sealing element 93 that receives an edge of the rear fixed glass panel 87.

FIG. 14 is another section across one of the stringer elements 68 showing the trackway on the inner edge thereof to receive the side edge of the rear movable roof section 50. In this case the section is taken at the upper edge of the window trackway 48 that is carried by the substantially vertically extending portions of the stringer elements 68 at rearmost end portions thereof.

With the vehicle shown, it is thought to be obvious that it has many uses both as a passenger carrier and as a load carrying vehicle. Because either one, two or three seat units may be used at any one time to carry any combination of passengers and load, it is extremely flexible in its use. It is thought to be clear that maximum load space may be obtained when only one seat, that is the driver's seat unit 25, is used for passenger carrying, as indicated by FIG. 5, with the rest of the vehicle being used for load carrying purposes. In the condition shown in FIG. 5, there is a co-planar load carrying compartment which extends from the fire wall 10 at the front end on the right side of the vehicle clear to the rear end of the vehicle. The co-planar load carrying surface is formed by the several inverted seat sections. In the event the front seat unit 28 should be used as a passenger carrying seat unit the remainder of the vehicle could be used for load carrying purposes. In the alternative both the front seats 25 and 26 as well as the middle seat unit could be used for passenger carrying purposes to accommodate at least six people and the rearwardly facing rear seat unit 38 could be folded to an inverted form to provide a relatively large load carrying space to the rear of the middle seat unit 32. It is also possible to have the rear seat unit 38 serve as a passenger carrying compartment because of its ready entrance and exit through the electrically operated rear door or tailgate 18 and to use the middle of the car as a load carrying compartment. In this case only the middle seat unit 32 would be inverted or folded down. The advantages of the use of the middle portion of the car as a load carrying compartment are thought to be quite evident from a consideration of FIG. 4. It will be noted from this figure that relatively large objects or load elements can be loaded into the body interior from either side of the car due to the fact that there is no "middle" post extending above the level of the load carrying surface.

Not only does this vehicle provide a very adaptable passenger carrying and load carrying vehicle, but it also provides a very sporty vehicle due to the fact that the roof structure is composed of three sections, two of which 50, 60, are movable from extended to retracted positions beneath a centrally located, rigid or fixed roof section 61. The roof unit 15 shown in the drawings may be considered to incorporate two sunshine roof sections 50, 60 which can be retracted or extended to meet the desires of the occupants of the various seat units of the vehicle.

While a specific mechanism for operating each of the various seats and doors on the disclosed vehicle has not been shown in detail, still, it is contemplated to have the rear door or tailgate 18 electrically operated through the jack mechanism 21. Also, it is proposed to have the window element 44 in the rear door 18 electrically operated by means of the mechanism 45. With such an arrangement when it is desired to open the rear door 18 actuation of a suitable switch by either the vehicle operator or an occupant of the rear seat would first lower the window element 44 of the rear door 18 within the door sectional portion of the door section 18. The door 18 would then be free to swing to an open position as it is disengaged from the trackways 48. Thereafter the jack mechanism 21 would become operative to swing the door 18 with the retracted window 44 through a 90 degree arc to its open position. Likewise, on door closing operation actuation of a suitable switch will first swing the door 18 to closed position where a switch would then be actuated by the closing of the door to eject or extend the window section 44 to its raised position.

While it is contemplated that both the movable roof sections 50 and 60 can be manually operated with great ease due to the fact that they are mounted on rollers in sloping trackways, still, it is also foreseeable that each of these sections might be electrically operated by a suitable screw jack mechanism, cable device, or the like. It is also foreseeable that at least the rear seat unit 38 could be electrically operated by a means such as that as disclosed in the aforementioned J. A. Huggins patent application Serial No. 538,150, now U.S. Patent 2,888,-296.

One of the advantages and improvements that has been incorporated in the disclosed suburban vehicle over and above what is shown in the aforementioned J. A. Huggins patent application Serial No. 538,150, now U.S. Patent 2,888,296 relates to the arrangement of the floor 115 (see FIG. 22) at the top level of the body cross member 116 so that the rear bumper portion 117 can be used as a step for entrance to the rear seat 40. With the construction shown it will be noted that there is no upstanding ridge or wall on the vehicle body that must be stepped over in order to enter the rear seat 40. With the arrangements shown it is very easy to step from the ground on to the rear step portion 117 and then directly into the rear seat 40 without having to step over any upwardly projecting body structural elements. Furthermore, because the rearmost shiftable roof section 50 can be retracted beneath the rigidly fixed central roof section 61, it is thought to be obvious that a passenger can enter the rear seat unit 38 from the rear end of the vehicle when the rear door 18 is open without having to bend or crouch in any manner. After the rear seat passengers have seated themselves in the rear seat unit 38 then the rearmost shiftable roof section 50 can be extended rearwardly to cover any portion of the rear seat unit 38 that is desired by the rear seat occupants.

We claim:

1. In a motor vehicle body having passenger doors at the sides and rear end thereof, a sectionalized top comprising a rigid top section extending crosswise of the vehicle body length intermediate the ends thereof, said rigid top section having rigid, transversely spaced, side portions extending lengthwise of the vehicle to the front end thereof, a first shiftable top section movably mounted on said rigid side portions and arranged to extend between said rigid top section and the front end of the top and to be retractible beneath said rigid top section, transversely spaced, longitudinally directed stringer members extending rearwardly from the rigid top section at opposite sides thereof, trackways carried by said stringer members, and a second shiftable top section movably mounted on said trackways, said second shiftable top section being arranged to extend between the rigid top section and the rear end of the top and to be retractible beneath said rigid top section, said door at the rear end of the body having an upper edge portion arranged to be sealingly engaged with the rear end of said second shiftable top section when said door is closed and said second shiftable top section is fully extended rearwardly.

2. In a motor vehicle body having passenger doors at the sides and rear end thereof, a sectionalized top comprising a rigid top section extending crosswise of the vehicle body length intermediate the ends thereof, said rigid top section having rigid, transversely spaced, side portions extending lengthwise of the vehicle to the front end thereof, a first shiftable top section movably mounted on said rigid side portions and arranged to extend between said rigid top section and the front end of the top and to be retractible beneath said rigid top section, transversely spaced longitudinally directed, stringer members extending rearwardly from the rigid top section at opposite sides thereof, trackways carried by said stringer members, and a second shiftable top section movably mounted on said trackways, said second shiftable top section being arranged to extend between the rigid top section and the rear end of the top and to be retractible beneath said rigid top section, and at least one of said shiftable top sections being transparent, said door at the rear end of the body having an upper edge portion arranged to be sealingly engaged with the rear end of said second shiftable top section when said door is closed and said second shiftable top section is fully extended rearwardly.

3. In a motor vehicle body having passenger doors at the sides and rear end thereof, a sectionalized top comprising a rigid top section extending crosswise of the vehicle body length intermediate the ends thereof, said rigid top section having rigid, transversely spaced, side portions extending lengthwise of the vehicle to the front end thereof, a first shiftable top section movably mounted on said rigid side portions and arranged to extend between said rigid top section and the front end of the top and to be retractible beneath said rigid top section, transversely spaced, longitudinally directed, stringer members extending rearwardly from the rigid top section at opposite sides thereof, trackways carried by said stringer members, and a second shiftable top section movably mounted on said trackways, said second shiftable top section being arranged to extend between the rigid top section and the rear end of top and to be retractible beneath said rigid top section, said rigid top section at each side thereof including pairs of trackways to movably mount said shiftable top sections, said door at the rear end of the body having an upper edge portion arranged to be sealingly engaged with the rear end of said second shiftable top section when said door is closed and said second shiftable top section is fully extended rearwardly.

4. In a motor vehicle body having passenger doors at the sides and rear end thereof, a sectionalized top comprising a rigid top section extending crosswise of the vehicle body length intermediate the ends thereof, said rigid top section having rigid, transversely spaced, side portions extending lengthwise of the vehicle to the front end thereof, a first shiftable top section movably mounted on said rigid side portions and arranged to extend between said rigid top section and the front end of the top and to be retractible beneath said rigid top section, transversely spaced, longitudinally directed, stringer members extending rearwardly from the rigid top section at opposite sides thereof, trackways carried by said stringer members, and a second shiftable top section movably mounted on said trackways, said second shiftable top section being arranged to extend between the rigid top section and the rear end of the top and to be retractible beneath said rigid top section, said rear door having a window slidably mounted in said trackways that is arranged to sealingly engage the rear end portion of the rearwardly located, second shiftable top section to form a continuation thereof when said second shiftable top is fully extended rearwardly.

5. In a motor vehicle body having passenger doors at the sides and rear end thereof, a sectionalized top comprising a rigid top section extending crosswise of the vehicle body length intermediate the ends thereof, said rigid top section having rigid, transversely spaced, side portions extending lengthwise of the vehicle to the front end thereof, a first shiftable top section movably mounted on said rigid side portions and arranged to extend between said rigid top section and the front end of the top and to be retractible beneath said rigid top section, transversely spaced, longitudinally directed, stringer members extending rearwardly from the rigid top section at opposite sides thereof, trackways carried by said stringer members, and a second shiftable top section movably mounted on said trackways, said second shiftable top section being arranged to extend between the rigid top section and the rear end of the top and to be retractible beneath said rigid top section, said rear door having a window at the upper portion thereof mounted for raising and lowering movement that is arranged to engage the rear end portion of the rearwardly located, second shiftable top section to form a continuation thereof, said stringer members including guideway means for slidably receiving said rear door window.

6. In a motor vehicle body having passenger doors at the sides and rear end thereof, a sectionalized top comprising a rigid top section extending crosswise of the vehicle body length intermediate the ends thereof, said rigid top section having rigid, transversely spaced, side portions extending lengthwise of the vehicle to the front end thereof, a first shiftable top section movably mounted on said rigid side portions and arranged to extend between said rigid top section and the front end of the top and to be retractible beneath said rigid top section, transversely spaced, longitudinally directed, stringer members extending rearwardly from the rigid top section at opposite sides thereof, trackways carried by said stringer members, and a second shiftable top section movably mounted on said trackways, said second shiftable top section being arranged to extend between the rigid top section and the rear end of the top and to be retractible beneath said rigid top section, said rear door having a window at the upper portion thereof mounted for raising and lowering movement that is arranged to engage the rear end portion of the rearwardly located, second shiftable top section to form a continuation thereof, said stringer members including guideway means for slidably receiving said rear door window, and also providing mounting means for side windows at the rear side portions of the vehicle body.

7. In a vehicle body having a side hinged, door extending across the body rear end, a bumper across the body rear end providing a step for entering the body interior through the rear door entranceway, and a floor for a rearwardly facing seating compartment located at the rear end of said body, said floor being positioned at the top of said step so as to provide an unobstructed entrance to said rearwardly facing seating compartment through said rear door, said vehicle body having a roof wherein the rear end portion that overlies said rearwardly facing seating compartment is shiftably mounted for movement forwardly of the rearwardly facing rear seat to prevent headroom interference with a passenger entering the rearwardly facing rear seat through the door in the body rear end, said door being arranged to sealingly engage the rear end of the shiftable roof portion when the door is closed and the shiftable roof portion is fully extended rearwardly.

8. In a motor vehicle having a forwardly facing front seat and a rearwardly facing rear seat, a rigid top comprising a fixed section located centrally of the length thereof between said front and rear seats and movable sections located at opposite ends of said fixed section and extending to opposite ends of the top, said movable sections being arranged to overlie said front and rear seats and to be slidably moved to positions in stacked relationship beneath said fixed section, and a movable door pivoted to the side of and extending across the rear end of the vehicle body providing passenger entrance to said rear seat, said door having a window at its upper portion arranged to sealingly engage with the rear end portion of the rear one of said movable roof sections, said window being arranged on said door for retraction and stowage therein.

References Cited in the file of this patent

UNITED STATES PATENTS

| | | |
|---|---|---|
| 1,746,349 | Hammond | Feb. 11, 1930 |
| 1,894,103 | Kuenzel | Jan. 10, 1933 |
| 2,434,711 | Mobbs et al. | Jan. 20, 1948 |
| 2,556,062 | Buehrig | June 5, 1951 |
| 2,647,788 | Kaiser et al. | Aug. 4, 1953 |
| 2,677,574 | Golubics | May 4, 1954 |
| 2,716,256 | Wise | Aug. 30, 1955 |
| 2,772,917 | Goldman | Dec. 4, 1956 |
| 2,888,296 | Huggins | May 26, 1959 |
| 2,895,763 | Wernig | July 21, 1959 |

FOREIGN PATENTS

| | | |
|---|---|---|
| 133,974 | Switzerland | Sept. 2, 1929 |
| 317,036 | Great Britain | 1930 |
| 347,940 | Great Britain | May 7, 1931 |
| 573,355 | Great Britain | Nov. 16, 1945 |
| 881,601 | France | Jan. 28, 1943 |